US008286546B2

(12) United States Patent
Rastelli et al.

(10) Patent No.: US 8,286,546 B2
(45) Date of Patent: Oct. 16, 2012

(54) LOBE DESIGN FOR FUEL PUMP ACTUATION

(75) Inventors: Roberto L Rastelli, Farmington, MI (US); James Fawcett, Clarkston, MI (US)

(73) Assignee: GM Global Technology Operations LLC

( * ) Notice: Subject to any disclaimer, the term of this patent is extended or adjusted under 35 U.S.C. 154(b) by 1044 days.

(21) Appl. No.: 12/246,710

(22) Filed: Oct. 7, 2008

(65) Prior Publication Data

US 2010/0083824 A1 Apr. 8, 2010

(51) Int. Cl.
*F16J 1/10* (2006.01)

(52) U.S. Cl. ........................................................ 92/129

(58) Field of Classification Search .............. 92/72, 126, 92/129; 123/508; 417/221, 222.1
See application file for complete search history.

(56) References Cited

U.S. PATENT DOCUMENTS 6,694,952 B1 2/2004 Yamazaki et al.
7,559,314 B2 * 7/2009 Remmelgas .................. 123/506

FOREIGN PATENT DOCUMENTS

CN 1282839 A 2/2001
WO WO 2006101424 A1 * 9/2006

* cited by examiner

*Primary Examiner* — Michael Leslie
(74) *Attorney, Agent, or Firm* — Harness, Dickey & Pierce, P.L.C.

(57) ABSTRACT

A fuel system may include a fuel pump and a drive shaft. The fuel pump may include a reciprocating member and the drive shaft may include a lobe member engaged with the reciprocating member. The lobe member may linearly displace the reciprocating member and drive the fuel pump. The lobe member may include a first lobe having a first opening flank driving a first compression stroke of the fuel pump through engagement with the reciprocating member. The first lobe may have a profile providing a constant velocity for the linear displacement of the reciprocating member for a portion of the first compression stroke.

20 Claims, 6 Drawing Sheets

LOBE DESIGN FOR FUEL PUMP ACTUATION

FIELD

The present disclosure relates to engine fuel pump assemblies, and more specifically to engine fuel pump drive systems.

BACKGROUND

The statements in this section merely provide background information related to the present disclosure and may not constitute prior art.

Engine assemblies may include fuel systems that incorporate a variety of types of fuel pumps to provide a pressurized fuel supply. High pressure fuel pumps may be used in direct injection engines. High pressure fuel pumps may include a reciprocating member driven by a lobe on a rotating shaft. The lobe profiles used to drive the fuel pumps typically drive the reciprocating member at a non-constant velocity throughout the compression stroke of the fuel pump.

SUMMARY

A fuel system may include a fuel pump and a drive shaft. The fuel pump may include a reciprocating member and the drive shaft may include a lobe member engaged with the reciprocating member. The lobe member may linearly displace the reciprocating member and drive the fuel pump. The lobe member may include a first lobe having a first opening flank driving a first compression stroke of the fuel pump through engagement with the reciprocating member. The first lobe may have a profile providing a constant velocity for the linear displacement of the reciprocating member for a portion of the first compression stroke.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

Figure 1:
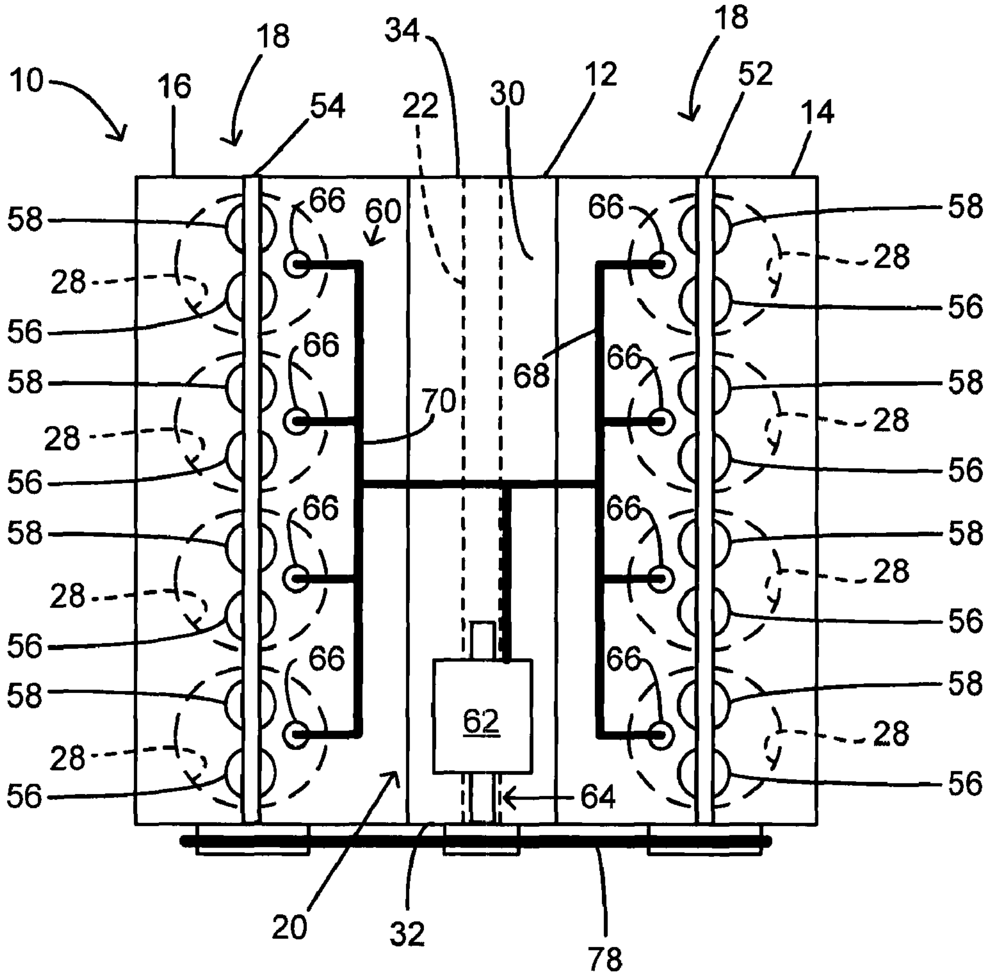
FIG. 1 is a schematic illustration of an engine assembly according to the present disclosure.

The following description is merely exemplary in nature and is not intended to limit the present disclosure, application, or uses. It should be understood that throughout the drawings, corresponding reference numerals indicate like or corresponding parts and features.

Figure 2:
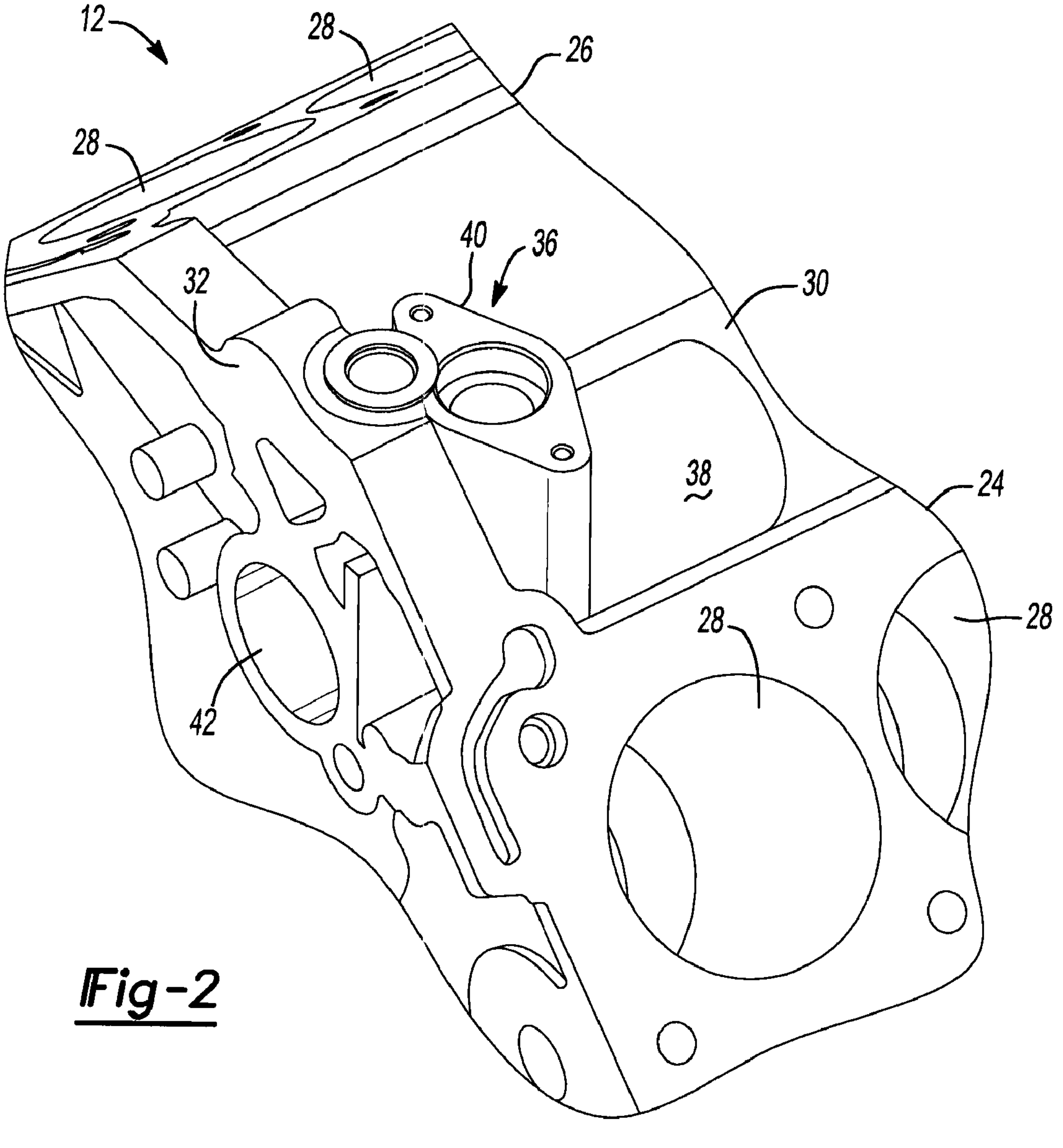
FIG. 2 is a fragmentary perspective view of the engine block of FIG. 1.
Figure 3:
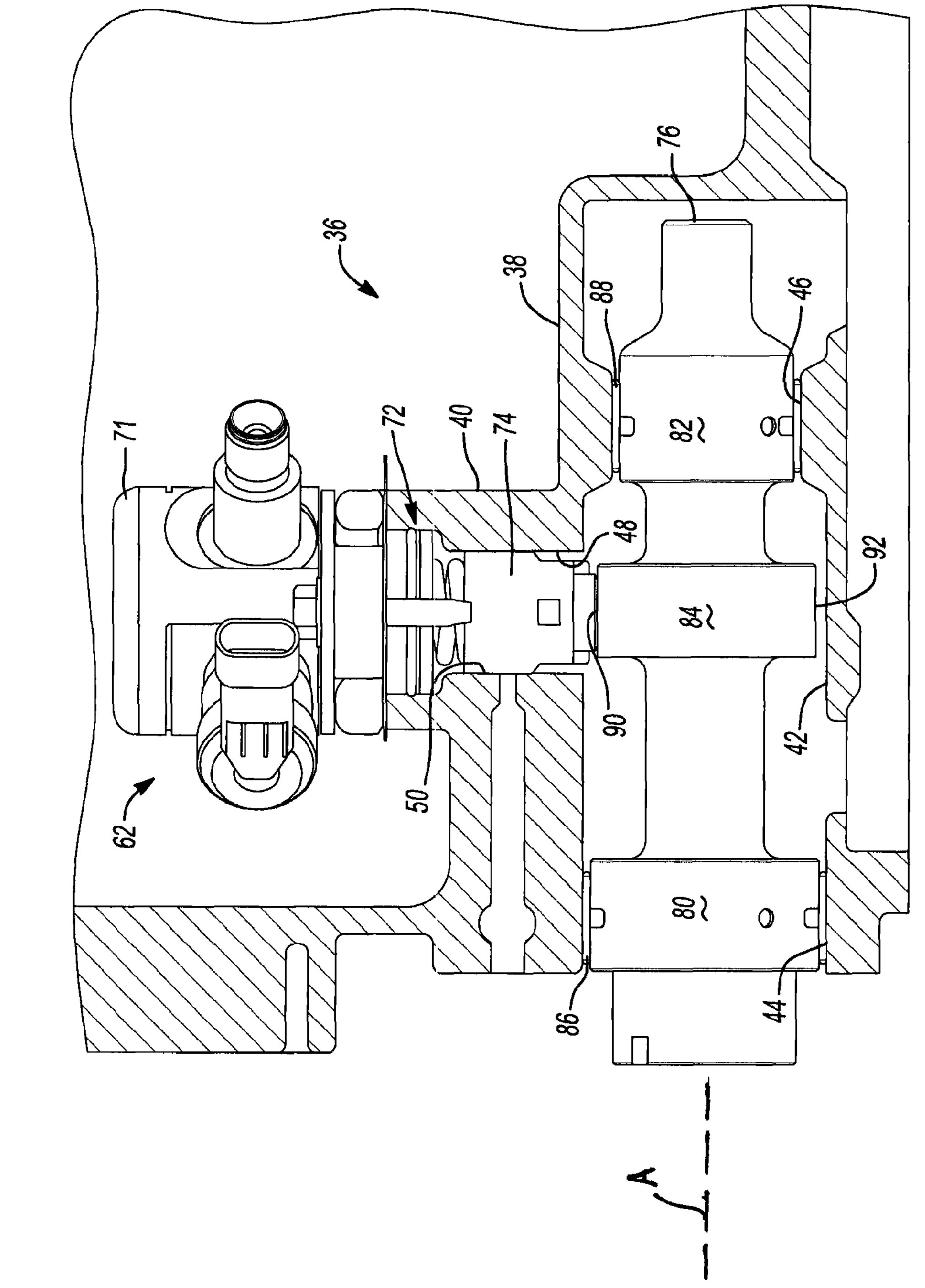
FIG. 3 is a fragmentary section view of the engine assembly of FIG. 1.

Referring now to FIGS. 1-3, an exemplary engine assembly 10 is schematically illustrated. The engine assembly 10 may include an engine block 12, first and second cylinder heads 14, 16, a valvetrain assembly 18, a fuel system 20, and a crankshaft 22.

As seen in FIG. 2, the engine block 12 may be a cast structure and may include first and second banks 24, 26 of cylinders 28. The first and second banks 24, 26 may be disposed at an angle relative to one another to form a V-configuration that defines a valley 30 between the first and second banks 24, 26. The crankshaft 22 may be rotatably supported by the engine block 12 below the valley 30. A first wall 32 may extend between the first and second banks 24, 26 at a first end of the valley 30 and a second wall 34 may extend between the first and second banks 24, 26 at a second end of the valley 30. The engine block 12 may further include a fuel system support structure 36 that is located within the valley 30 between the first and second banks 24, 26 and between the first and second walls 32, 34.

As seen in FIGS. 2 and 3, the fuel system support structure 36 may include a shaft housing 38 and a pump mount member 40. The shaft housing 38 may define a bore 42 that includes first and second bearing regions 44, 46 and an opening 48 that extends into the shaft housing 38 and is located axially between the first and second bearing regions 44, 46. The pump mount member 40 may extend from the shaft housing 38 and may include an opening 50 aligned with the opening 48 in the shaft housing 38.

Referring back to FIG. 1, the first cylinder head 14 may be fixed to the first bank 24 of engine block 12 and the second cylinder head 16 may be fixed to the second bank 26. The valvetrain assembly 18 may include a first camshaft 52 that is supported by the first cylinder head 14 and a second camshaft 54 that is supported by the second cylinder head 16 to form an overhead cam engine configuration. The valvetrain assembly 18 may further include intake and exhaust valves 56, 58 for each cylinder 28 that are actuated by the first and second camshafts 52, 54.

Referring to FIGS. 1 and 3, the fuel system 20 may include a fuel delivery system 60, a fuel pump 62, and a fuel pump drive system 64. The fuel delivery system 60 may include fuel injectors 66 and first and second fuel rails 68, 70. The first and second fuel rails 68, 70 may be in communication with the fuel injectors 66 to provide fuel to each of the cylinders 28. The fuel injectors 66 may include direct-injection fuel injectors that are in direct communication with the cylinders 28 to form a direct-injection fuel system.

The fuel pump 62 may be in communication with the first and second fuel rails 68, 70 to provide a pressurized fuel supply to the cylinders 28. The fuel pump 62 may be fixed to the pump mount member 40. The fuel pump 62 may include a pump mechanism 71 and a drive mechanism 72. The pump mechanism 71 may include a reciprocating pump fixed to the pump mount member 40 and the drive mechanism 72 may include a lifter mechanism 74 that extends through the openings 48, 50 in the fuel system support structure 36 and engages the fuel pump drive system 64. The lifter mechanism 74 may form a reciprocating member. The fuel pump drive system 64 may linearly displace the drive mechanism 72 to drive the pump mechanism 71, as discussed below. The fuel pump 62 may include a high pressure fuel pump that operates at pressures greater than 10,000 kilopascal (kPa).

The fuel pump drive system 64 may include a drive shaft 76 that is driven by the crankshaft 22. The drive shaft 76 may be located within the bore 42 of the shaft housing 38 and may be engaged with the crankshaft 22 through a drive arrangement 78. For example, the drive arrangement 78 may include a belt or a chain that is drivingly engaged with the drive shaft 76 and the first and second camshafts 52, 54. The drive shaft 76 may be driven at a rotational speed that is less than the rotational speed of the crankshaft 22 and greater than the rotational speed of the first and second camshafts 52, 54. In the present example, the first and second camshafts 52, 54 may be driven at one-half of the rotational speed of the crankshaft 22. In another non-limiting example, the drive shaft 76 may be driven at three-fourths of the rotational speed of the crankshaft 22.

The drive shaft 76 may include first and second bearing portions 80, 82 and a lobed portion 84. The first bearing portion 80 may be rotatably supported by a first bearing 86 at the first bearing region 44 of the shaft housing 38 and the second bearing portion 82 may be rotatably supported by a second bearing 88 at the second bearing region 46 of the shaft housing 38. The lobed portion 84 may be located axially between the first and second bearing portions 80, 82 and may be aligned with the openings 48, 50 in the fuel system support structure 36. With additional reference to FIG. 4, the lobed portion 84 may include first and second lobes 90, 92. The drive mechanism 72 of the fuel pump 62 may be engaged with the lobed portion 84 of the drive shaft 76. The present example shows the lifter mechanism 74 being displaced by the first and second lobes 90, 92 to drive the pump mechanism 71. The lobed portion 84 may reciprocate the drive mechanism 72 twice per revolution of the drive shaft 76. The drive shaft 76 may rotate in the direction indicated by arrow ($R_1$) during engine operation.

The first and second lobes 90, 92 may be spaced approximately one hundred and eighty degrees from one another and may be generally similar to one another. Therefore, the first lobe 90 will be described with the understanding that the description applies equally to the second lobe 92. The first lobe 90 may include an opening flank 94, a closing flank 96, and a peak 98. The lobe member 84 may include base circle 102 having a radius ($R_{a1}$). The opening flank 94 may extend from a starting point 100 on the base circle 102 of the lobed portion 84 and the closing flank 96 may terminate at an ending point 104 on the base circle 102. The peak 98 may be located between the starting point 100 and the ending point 104 and may define an end of the opening flank 94 and a beginning of the closing flank 96. The opening flank 94 may extend greater than one-half of the angular distance along the base circle 102 from the peak 98 of the first lobe 90 to the peak 99 of the second lobe 92. Additionally, a portion 103 of the opening flank 94 may have a constantly increasing radially outward extent.

Figure 4:
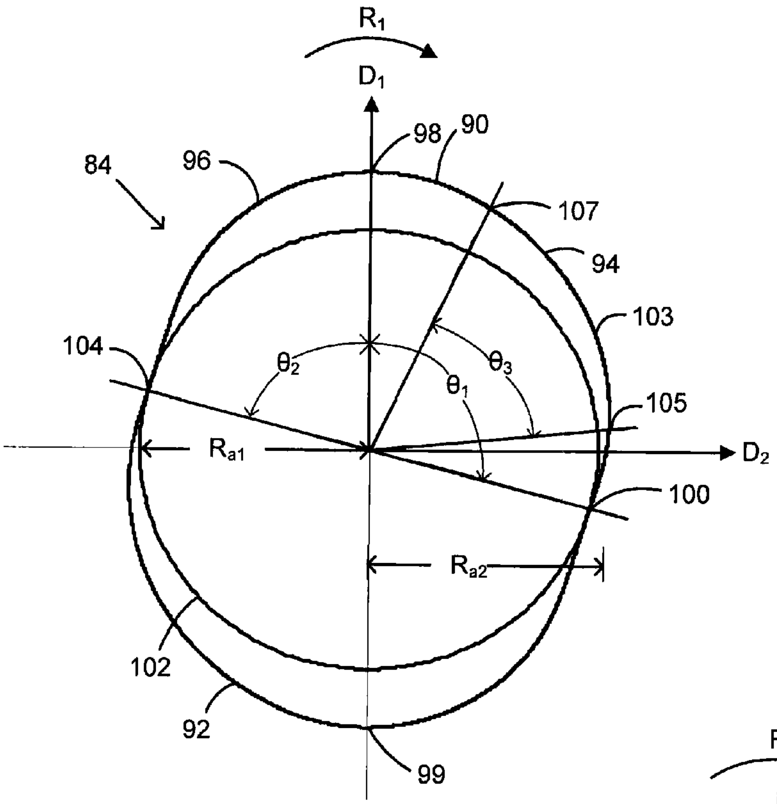
FIG. 4 is a schematic illustration of a first lobe profile of a fuel pump drive system according to the present disclosure.

As seen in FIG. 4, the opening and closing flanks 94, 96 may be non-symmetric relative to one another. More specifically, the opening flank 94 may have a first angular extent ($\theta_1$) along the base circle 102 and the closing flank 96 may have a second angular extent ($\theta_2$). The first angular extent ($\theta_1$) may be greater than the second angular extent ($\theta_2$) providing a greater duration of displacement of the lifter mechanism 74 from the opening flank 94 during a compression stroke of the fuel pump 62 relative to the displacement of the lifter mechanism 74 during a return stroke provided by the closing flank 96. More specifically, the first angular extent ($\theta_1$) may be at least ten percent greater than the second angular extent ($\theta_2$). For example, the first angular extent ($\theta_1$) may be greater than ninety degrees, and more specifically greater than one hundred degrees, and the second angular extent ($\theta_2$) may be less than ninety degrees, and more specifically less than eighty degrees. In the present example, the first angular extent ($\theta_1$) may be approximately one hundred and five degrees and the second angular extent ($\theta_2$) may be approximately seventy-five degrees. Therefore, a perimeter of the opening flank 94 may be greater than a perimeter of the closing flank 96.

The peak 98 of the first lobe 90 may be located radially outward from the base circle 102 in a first radial direction ($D_1$). The maximum radial width ($R_{a2}$) of the opening flank 94 may be defined in a second radial direction ($D_2$) generally perpendicular to the first radial direction ($D_1$) and generally perpendicular to the longitudinal axis (A) of the drive shaft, seen in FIG. 3. The maximum radial width ($R_{a2}$) of the opening flank 94 may be greater than the radius ($R_{a1}$) of the base circle 102.

Figure 6:
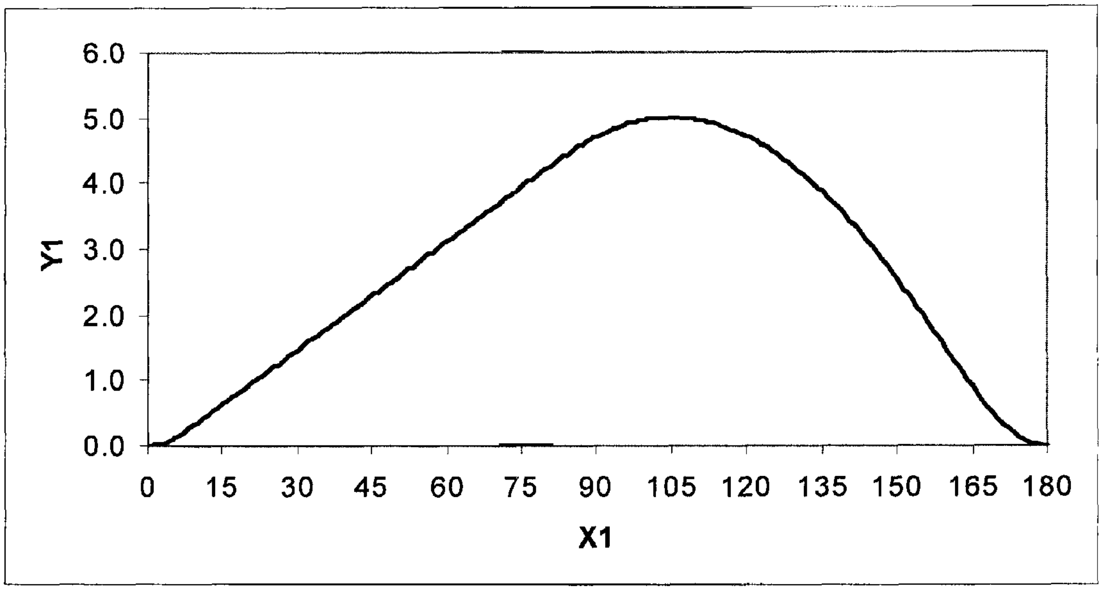
FIG. 6 is a chart illustrating displacement of a fuel pump drive mechanism based on the first lobe profile of FIG. 4.
Figure 7:
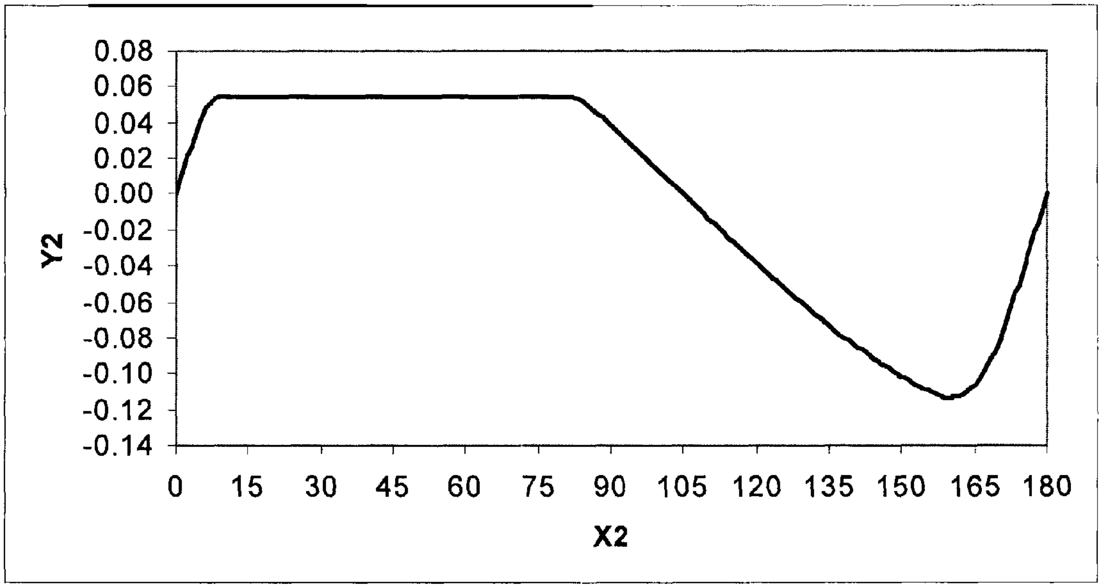
FIG. 7 is a chart illustrating velocity of a fuel pump drive mechanism based on the first lobe profile of FIG. 4.

With additional reference to FIGS. 6 and 7, the displacement and velocity of the lifter mechanism 74 provided by the lobed portion 84 are illustrated. FIG. 6 generally illustrates displacement in millimeters (mm) of the lifter mechanism 74 along the Y-axis (Y1) and rotational displacement in degrees of the drive shaft 76 along the X-axis (X1). FIG. 7 generally illustrates velocity in mm/degree of the lifter mechanism 74 along the Y-axis (Y2) and rotational displacement in degrees of the drive shaft 76 along the X-axis (X2). In FIGS. 6 and 7, zero degrees generally corresponds to the starting point 100, one hundred and five degrees generally corresponds to the peak 98, and one hundred and eighty degrees generally corresponds to the ending point 104.

As discussed above, the present non-limiting example illustrates the first angular extent ($\theta_1$) as one hundred and five degrees and the second angular extent ($\theta_2$) as seventy-five degrees. Therefore, the charts shown in FIGS. 6 and 7 generally illustrate the engagement between the opening flank 94 and the lifter mechanism 74 from zero to one hundred and five degrees along X-axes (X1, X2) and the engagement between the closing flank 96 and the lifter mechanism 74 from one hundred and five degrees to one hundred and eighty degrees along X-axes (X1, X2).

Also as discussed above, the profile of the opening flank 94 may provide a constant velocity for displacement of the lifter mechanism 74 during a compression stroke of the lifter mechanism 74. The profile of the opening flank 94 may provide a constant velocity for the linear displacement of the lifter mechanism 74 for at least ten percent of the compression stroke of the lifter mechanism 74. For example, the opening flank 94 may provide a constant velocity for the linear displacement of the lifter mechanism 74 for at least twenty-five degrees of rotation of the drive shaft 76, and more specifically for at least sixty degrees of rotation of the drive shaft 76.

As discussed above, a portion 103 of the opening flank 94 may have a constantly increasing radial outward extent at a linear rate along an angular span ($\theta_3$) of the opening flank 94. The portion 103 may begin at a first point 105 on the opening flank 94 and end at a second point 107 on the opening flank 94 rotationally offset from the first point 105 by the angular span ($\theta_3$). The angular span ($\theta_3$) between the first and second points 105, 107 may be at least ten percent of the first angular extent ($\theta_1$) of the opening flank 94 along the base circle 102. For example, the angular span ($\theta_3$) may be at least twenty-five degrees, and more specifically at least sixty degrees. In the present non-limiting example, the first point 105 may be approximately ten degrees from the starting point 100 and the second point 107 may be approximately eighty degrees from the starting point 100, creating an angular span ($\theta_3$) of approximately seventy degrees.

Therefore, FIG. 7 illustrates a constant velocity of the lifter mechanism 74 for approximately seventy degrees of rotation of the drive shaft 76 from approximately ten degrees to approximately eighty degrees. The portion of FIGS. 6 and 7 from one hundred and five degrees to one hundred and eighty degrees generally illustrates a return stroke of the lifter mechanism 74. As seen in FIG. 7, the peak velocity of the return stroke may be greater than the peak velocity of the compression stroke, and more specifically at least fifty percent greater than the peak velocity of the compression stroke. In the present example, the peak velocity of the compression stroke generally corresponds to the constant velocity portion of the compression stroke.

Figure 5:
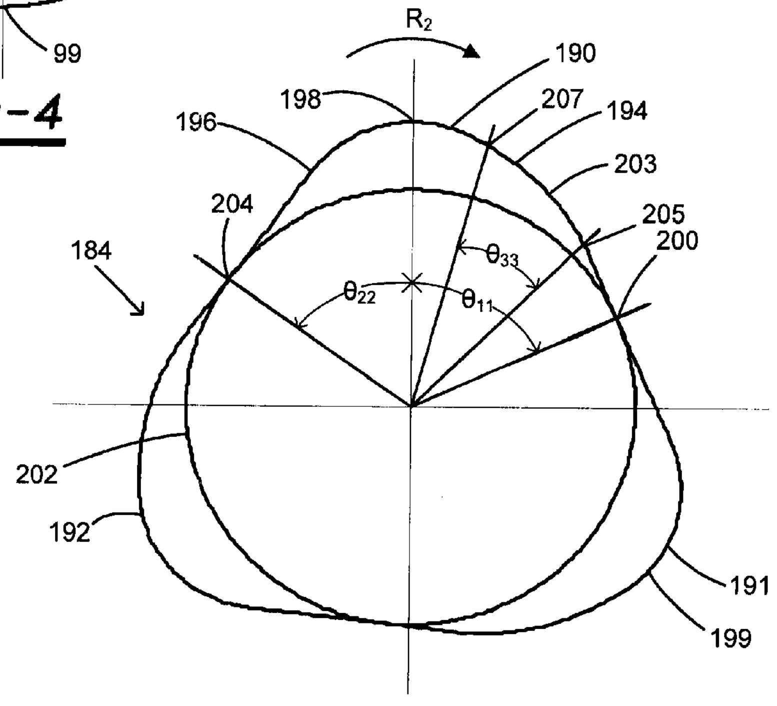
FIG. 5 is a schematic illustration of a second lobe profile of a fuel pump drive system according to the present disclosure.

An alternate lobed portion 184, seen in FIG. 5, may be used in place of the lobed portion 84. The lobed portion 184 may include first, second, and third lobes 190, 191, 192. The lobed portion 184 may reciprocate the drive mechanism 72 three times per revolution of the lobed portion 184 in the direction indicated by arrow ($R_2$) during engine operation.

The first, second, and third lobes 190, 191, 192 may be spaced approximately one hundred and twenty degrees from one another and may be generally similar to one another. Therefore, the first lobe 190 will be described with the understanding that the description applies equally to the second and third lobes 191, 192. The first lobe 190 may include an opening flank 194, a closing flank 196 and a peak 198. The lobe member 184 may include a base circle 202. The opening flank 194 may extend from a starting point 200 on the base circle 202 of the lobed portion 184 and the closing flank 196 may terminate at an ending point 204 on the base circle 202. The peak 198 may be located between the starting point 200 and the ending point 204 and may define an end of the opening flank 194 and a beginning of the closing flank 196. The opening flank 194 may extend greater than one-half of the angular distance along the base circle 202 from the peak 198 of the first lobe 190 to the peak 199 of the second lobe 191. Additionally, a portion 203 of the opening flank 194 may have a constantly increasing radially outward extent.

As seen in FIG. 5, the opening and closing flanks 194, 196 may be non-symmetric relative to one another. More specifically, the opening flank 194 may have a first angular extent ($\theta_{11}$) along the base circle 202 and the closing flank 196 may have a second angular extent ($\theta_{22}$). The first angular extent ($\theta_{11}$) may be greater than the second angular extent ($\theta_{22}$) providing a greater duration of displacement of the lifter mechanism 74 from the opening flank 194 during a compression stroke of the fuel pump 62 relative to the displacement of the lifter mechanism 74 during a return stroke provided by the closing flank 196. More specifically, the first angular extent ($\theta_{11}$) may be at least ten percent greater than the second angular extent ($\theta_{22}$). For example, the first angular extent ($\theta_{11}$) may be greater than sixty degrees and the second angular extent ($\theta_{22}$) may be less than sixty degrees. In the present example, the first angular extent ($\theta_{11}$) may be approximately sixty-five degrees and the second angular extent ($\theta_{22}$) may be approximately fifty-five degrees. Therefore, a perimeter of the opening flank 194 may be greater than a perimeter of the closing flank 196.

Figure 8:
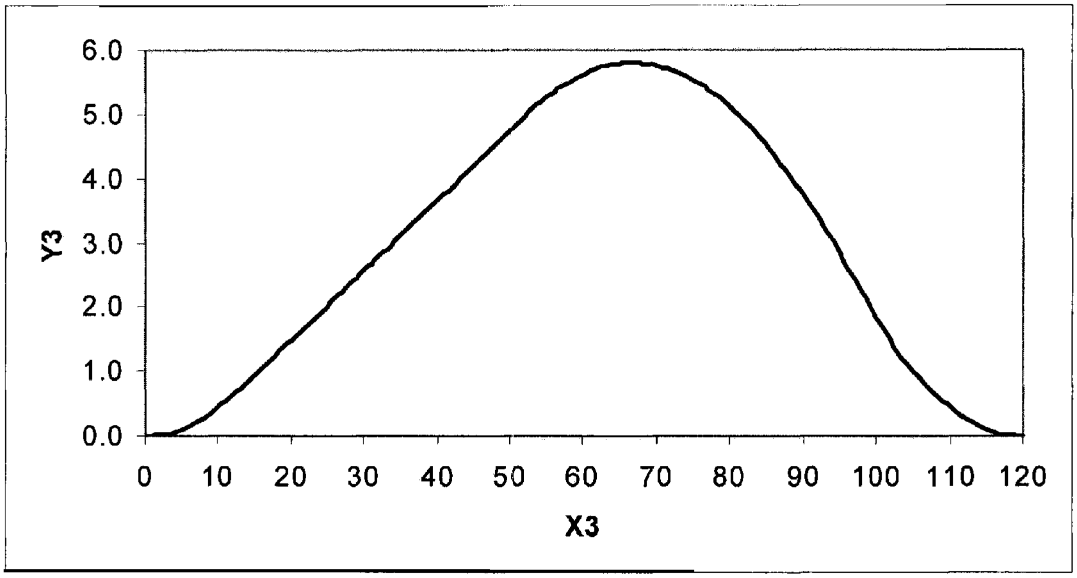
FIG. 8 is a chart illustrating displacement of a fuel pump drive mechanism based on the second lobe profile of FIG. 5.
Figure 9:
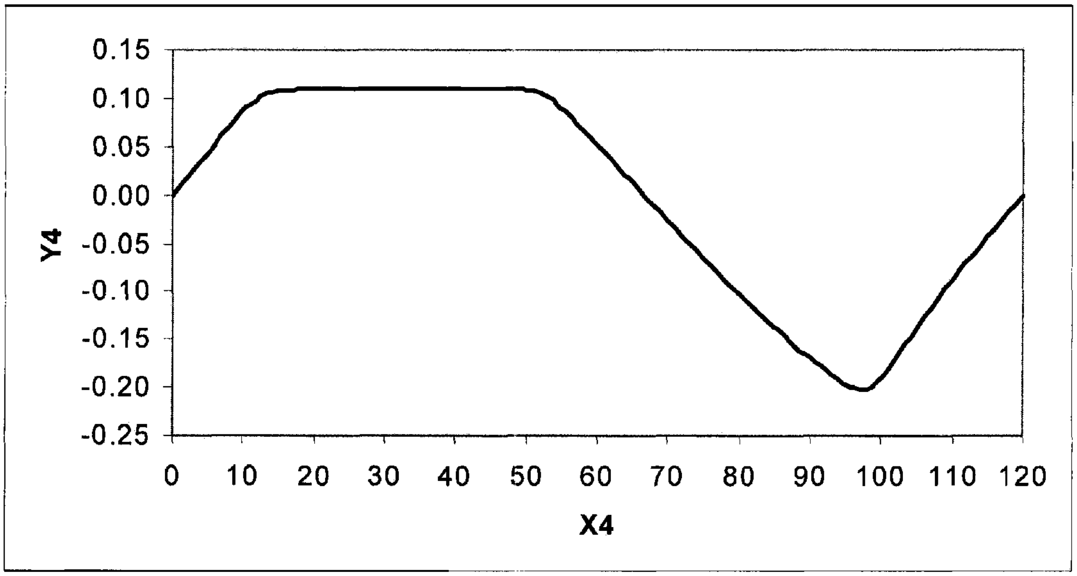
FIG. 9 is a chart illustrating velocity of a fuel pump drive mechanism based on the second lobe profile of FIG. 5.

With additional reference to FIGS. 8 and 9, the displacement and velocity of the lifter mechanism 74 provided by the lobed portion 184 are illustrated. FIG. 8 generally illustrates displacement in millimeters (mm) of the lifter mechanism 74 along the Y-axis (Y3) and rotational displacement in degrees of the drive shaft 76 along the X-axis (X3). FIG. 9 generally illustrates velocity in mm/degree of the lifter mechanism 74 along the Y-axis (Y4) and rotational displacement in degrees of the drive shaft 76 along the X-axis (X4). In FIGS. 8 and 9, zero degrees generally corresponds to the starting point 200, sixty-five degrees generally corresponds to the peak 198, and one hundred and twenty degrees generally corresponds to the ending point 204.

As discussed above, the present non-limiting example illustrates the first angular extent ($\theta_{11}$) as sixty-five degrees and the second angular extent ($\theta_{22}$) as fifty-five degrees. Therefore, the charts shown in FIGS. 8 and 9 generally illustrate the engagement between the opening flank 194 and the lifter mechanism 74 from zero to sixty-five degrees along X-axes (X3, X4) and the engagement between the closing flank 196 and the lifter mechanism 74 from sixty-five degrees to one hundred and twenty degrees along X-axes (X3, X4).

The profile of the opening flank 194 may provide a constant velocity for displacement of the lifter mechanism 74 during a compression stroke of the lifter mechanism 74. The profile of the opening flank 194 may provide a constant velocity for the linear displacement of the lifter mechanism 74 for at least ten percent of the compression stroke of the lifter mechanism 74. For example, the opening flank 194 may provide a constant velocity for the linear displacement of the lifter mechanism 74 for at least twenty-five degrees of rotation of the drive shaft 76.

As discussed above, a portion 203 of the opening flank 194 may have a constantly increasing radial outward extent at a linear rate along an angular span ($\theta_{33}$) of the opening flank 194. The portion 203 may begin at a first point 205 on the opening flank 194 and end at a second point 207 on the opening flank 194 rotationally offset from the first point 205 by the angular span ($\theta_{33}$). The angular span ($\theta_{33}$) between the first and second points 205, 207 may be at least ten percent of the first angular extent ($\theta_{11}$) of the opening flank 194 along the base circle 202. For example, the angular span ($\theta_{33}$) may be at least twenty-five degrees, and more specifically at least sixty degrees. In the present non-limiting example, the first point 205 may be approximately fifteen degrees from the starting point 200 and the second point 207 may be approximately fifty degrees from the starting point 200, creating an angular span ($\theta_{33}$) of approximately thirty-five degrees.

In the present example, FIG. 9 illustrates a constant velocity of the lifter mechanism 74 for approximately thirty-five degrees of rotation of the drive shaft 76 from approximately fifteen degrees to approximately fifty degrees. The portion of FIGS. 8 and 9 from sixty-five degrees to one hundred and twenty degrees generally illustrates a return stroke of the lifter mechanism 74. As seen in FIG. 9, the peak velocity of the return stroke may be greater than the peak velocity of the compression stroke, and more specifically at least fifty percent greater than the peak velocity of the compression stroke. In the present example, the peak velocity of the compression stroke generally corresponds to the constant velocity portion of the compression stroke.

It is understood that while the lobed portion 84 is described as including two lobes 90, 92 and the lobed portion 184 is described as including three lobes 190, 191, 192, a variety of alternate configurations for lobed portions may be used as well. For example, single lobe configurations and four lobe configurations may be used and may include profiles having the constant velocity features discussed above. Therefore, the present teachings are not limited to two and three lobe designs. Additionally, while the fuel pump 62 has been described as being mounted in the engine block 12 and the various lobe profiles have been discussed as being incorporated into a fuel pump drive shaft that is used solely to drive the fuel pump 62, various alternate configurations may be used to incorporate the present teachings. For example, a fuel pump may be mounted in a cylinder head and driven by a lobed portion on a camshaft having one or more of the profiles discussed above. Therefore, the present teachings are equally applicable to camshaft driven fuel pumps. For example, in alternate arrangements where the lobed portion is included on a camshaft, the camshaft may form the drive shaft discussed above.

What is claimed is:

1. A fuel system comprising:

a fuel pump including a reciprocating member; and a drive shaft including a lobe member engaged with the reciprocating member of the fuel pump to linearly displace the reciprocating member and drive the fuel pump, the lobe member including a first lobe having a first opening flank driving a first compression stroke of the fuel pump through engagement with the reciprocating member and having a profile providing a constant velocity for the linear displacement of the reciprocating member for a portion of the first compression stroke, the lobe member including a base circle having the first lobe extending radially outward therefrom and the first lobe including a closing flank for guiding a return stroke of the fuel pump through engagement with the reciprocating member, the first opening flank having a starting point at a first location on the base circle and the closing flank having an ending point at a second location rotationally displaced from the first location, the first opening flank extending along a greater angular extent of the base circle than the closing flank.

2. The fuel system of claim 1, wherein the lobe member includes a base circle, a portion of the opening flank providing a constant velocity for the linear displacement of the reciprocating member for at least 10 percent of the first compression stroke, the portion of the opening flank beginning at a first point on the profile and ending at a second point on the profile rotationally offset relative to the first point, an outward radial extent of the portion of the opening flank increasing at a constant linear rate from the first point to the second point.

3. The fuel system of claim 1, wherein the angular extent of the first opening flank is at least 10 percent greater than the angular extent of the closing flank.

4. The fuel system of claim 1, wherein the first lobe includes a closing flank for guiding a return stroke of the fuel pump through engagement with the reciprocating member, the closing flank being non-symmetric with respect to the first opening flank.

5. The fuel system of claim 1, wherein the first lobe includes a closing flank for guiding a return stroke of the fuel pump through engagement with the reciprocating member, the first opening flank having a perimeter that is greater than a perimeter of the closing flank.

6. The fuel system of claim 1, wherein the first lobe includes a closing flank for guiding a return stroke of the fuel pump through engagement with the reciprocating member, the closing flank providing a peak velocity for displacement of the reciprocating member that is at least 50 percent greater than a peak velocity provided by the first opening flank.

7. The fuel system of claim 1, wherein the lobe member includes a base circle defining a radius and having the first lobe extending radially outward therefrom, the first lobe including a closing flank for guiding a return stroke of the fuel pump through engagement with the reciprocating member and a peak located between the opening and closing flanks, the peak defining a maximum height of the first lobe relative to a center of the base circle, a maximum width of first opening flank of the first lobe relative to the center of the base circle and extending generally perpendicular to a longitudinal axis of the drive shaft being greater than the radius of the base circle.

8. The fuel system of claim 7, wherein a maximum width of the closing flank of the first lobe relative to the center of the base circle and extending generally perpendicular to the longitudinal axis of the drive shaft being less than or equal to the radius of the base circle.

9. The fuel system of claim 1, wherein the lobe member includes a second lobe, the first lobe including a first peak and the second lobe including a second peak rotationally spaced a first distance from the first peak, the first opening flank of the first lobe extending a second distance greater than one-half of the first distance.

10. The fuel system of claim 1, wherein the lobe member includes a second lobe rotationally spaced from the first lobe and having a second opening flank driving a second compression stroke subsequent to the first compression stroke of the fuel pump through engagement with the reciprocating member, the second lobe having a profile providing a constant velocity for the linear displacement of the reciprocating member for at least 25 degrees of drive shaft rotation during the second compression stroke, the first opening flank providing a constant velocity for the linear displacement of the reciprocating member for at least 25 degrees of drive shaft rotation during the first compression stroke.

11. The fuel system of claim 10, wherein the lobe member includes a third lobe rotationally spaced from the first and second lobes and having a third opening flank driving a third compression stroke subsequent to the first and second compression strokes of the fuel pump through engagement with the reciprocating member and having a profile providing a constant velocity for the linear displacement of the reciprocating member for at least 25 degrees of drive shaft rotation during the third compression stroke.

12. The fuel system of claim 10, wherein the first opening flank provides a constant velocity for the linear displacement of the reciprocating member for at least 60 degrees of drive shaft rotation and the second opening flank provides a constant velocity for the linear displacement of the reciprocating member for at least 60 degrees of drive shaft rotation.

13. The fuel system of claim 1, wherein the fuel pump is a direct injection fuel pump.

14. A fuel pump drive shaft comprising:

a lobe member including a first lobe extending from a base circle of the lobe member, the first lobe including an opening flank adapted to linearly displace a reciprocating member of a fuel pump during a compression stroke of the fuel pump, a closing flank adapted to guide the reciprocating member during a return stroke of the reciprocating member, and a peak located between the opening and closing flanks and defining an end of the opening flank and a beginning of the closing flank, the opening flank having a profile providing a constant velocity for a portion of the compression stroke of the reciprocating member, the lobe member including a base circle having the first lobe extending therefrom and the opening flank having a greater angular extent along the base circle than the closing flank.

15. The fuel pump drive shaft of claim 14, wherein the lobe member includes a base circle, a portion of the opening flank providing a constant velocity for the linear displacement of the reciprocating member for at least 10 percent of the compression stroke, the portion of the opening flank beginning at a first point on the profile and ending at a second point on the profile rotationally offset relative to the first point, an outward radial extent of the portion of the opening flank increasing at a constant linear rate from the first point to the second point.

16. The fuel pump drive shaft of claim 14, wherein the closing flank is non-symmetric with respect to the opening flank.

17. The fuel pump drive shaft of claim 14, wherein the lobe member includes a base circle defining a radius and having the first lobe extending therefrom, the peak defining a maximum height of the first lobe relative to a center of the base circle, a maximum width of the opening flank of the first lobe relative to the center of the base circle and extending generally perpendicular to a longitudinal axis of the drive shaft being greater than the radius of the base circle.

18. The fuel pump drive shaft of claim 14, wherein the opening flank has a profile providing a constant velocity for the linear displacement of the reciprocating member for at least 25 degrees of drive shaft rotation during the compression stroke.

19. A fuel system comprising:

a fuel pump including a reciprocating member; and a drive shaft including a lobe member engaged with the reciprocating member of the fuel pump to linearly displace the reciprocating member and drive the fuel pump, the lobe member including:

a first lobe having a first opening flank driving a first compression stroke of the fuel pump through engagement with the reciprocating member and having a profile providing a constant velocity for the linear displacement of the reciprocating member for at least 25 degrees of drive shaft rotation during the first compression stroke; and a second lobe rotationally spaced from the first lobe and having a second opening flank driving a second compression stroke subsequent to the first compression stroke of the fuel pump through engagement with the reciprocating member and having a profile providing a constant velocity for the linear displacement of the reciprocating member for at least 25 degrees of drive shaft rotation during the second compression stroke.

20. The fuel system of claim 19, wherein the lobe member includes a third lobe rotationally spaced from the first and second lobes and having a third opening flank driving a third compression stroke subsequent to the first and second compression strokes of the fuel pump through engagement with the reciprocating member and having a profile providing a constant velocity for the linear displacement of the reciprocating member for at least 25 degrees of drive shaft rotation during the third compression stroke.

* * * * *